UNITED STATES PATENT OFFICE.

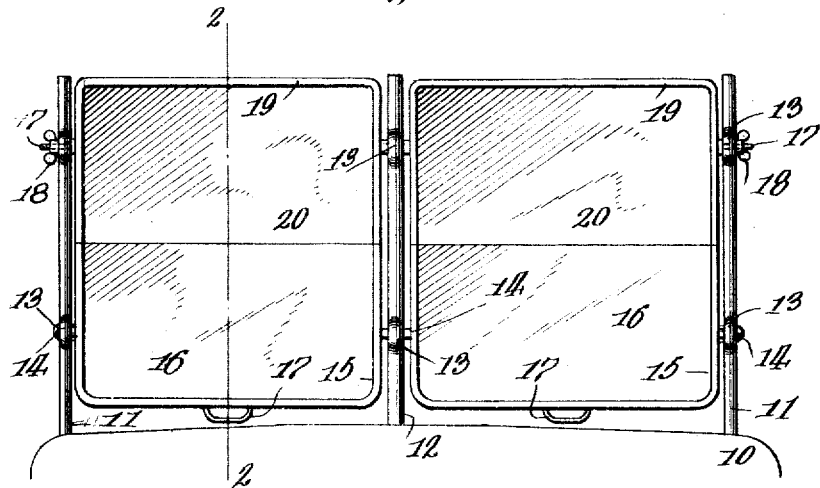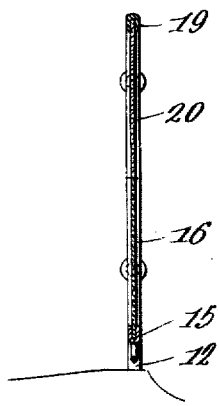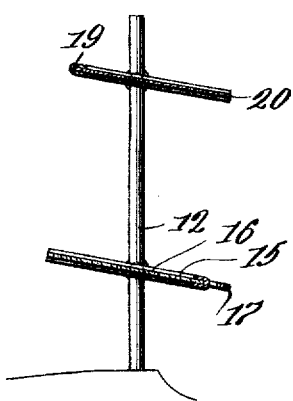

BYRON L. SHUBERT, OF VLIETS, KANSAS.

INDIVIDUAL WIND-SHIELD.

1,272,130.        Specification of Letters Patent.        Patented July 9, 1918.

Application filed June 15, 1917. Serial No. 174,996.

*To all whom it may concern:*

Be it known that I, BYRON L. SHUBERT, a citizen of the United States, residing at Vliets, in the county of Marshall and State of Kansas, have invented certain new and useful Improvements in Individual Wind-Shields, of which the following is a specification.

This invention relates to wind shields, and it more particularly relates to an improved device of this character which may be termed a duplex shield or pair of individual shields.

One of the objects of this invention is to provide an automobile with means for protecting one occupant of the automobile from the wind, while allowing the wind to have free passage upon another occupant of the automobile.

Another object of this invention is to provide a device of this character which is very simple of construction, convenient and easy to operate, and which is comparatively inexpensive to manufacture and install upon an automobile.

Other objects and advantages may become apparent to persons who read the following detailed description in connection with the accompanying drawings, in which:

Figure 1 is a front elevation of the device applied to the front portion of an automobile.

Fig. 2 is a vertical sectional view taken on the line 2—2 of Fig. 1; and

Fig. 3 is a view similar to Fig. 2, illustrating the device in its open position.

Referring to these drawings in detail, the reference character 10 represents the front portion of an automobile, while 11 and 12 represent the outer and inner standards or supports, respectively, which are secured to the automobile by any appropriate means.

The standards 11 and 12 are provided with bearing elements 13, in the lower ones of which are journaled suitable pivots 14 which are preferably spring-pressed, in any usual way, so as to provide a frictional connection between the standards 11 and the lower shield frames 15 which are carried by the studs 14. Each of the frames 15 carries a transparent plate 16, and each frame 15 also carries a handle 17, these handles being conveniently positioned to be grasped by an occupant of the automobile, so as to turn either or both of the frames 15, together with their plate or plates 16, into the position shown in Fig. 3. It will be understood that the frictional engagement of the studs 14 with the standards 11 and 12 effectually detains the respective frames 15 in whatever position they may be placed; also, that either of the frames 15 may be adjusted independently of the other said frames.

In the upper bearings 13 are journaled pivots 17 the outer ones of which are screw-threaded for the reception of wing nuts 18. The pivots 17 support a pair of upper frames 19, each of which carries a transparent shield 20, the latter having its lower edge abutting against the upper edge of the shield or plate 16, or so closely adjoining thereto as to preclude the entrance of any considerable volume of air therebetween, while sufficient clearance is provided for the free and independent movement of either of the shield elements 16 and 20.

The frames 15 and 19 are each substantially U-shaped, and the transparent elements 16 and 20 are secured, respectively, in said frames by any appropriate means, and the view is unbroken by any opaque element between the lower part of each frame 19 and the upper part of each frame 15.

From the foregoing it will be seen that I have provided a device of this character which is very simple of construction, practical in its operation, and exceedingly convenient and effective for the purpose intended. Moreover, it is believed that, owing to the difference in personal temperament, health conditions and varying desires, that this device will become very popular among automobile owners.

What I claim as my invention is:

A wind shield for automobiles, comprising a middle and side standards provided with upper and lower bearings in coincident relation, a pair of lower U-shaped frames having lateral studs mounted in the lower bearings of the standards, and having depending handles on their lower elements, a pair of upper inverted U-shaped frames having lateral studs journaled in the upper bearings of the standards, the outer studs being threaded, nuts mounted on the threaded studs to secure the upper frames in an adapted position, and transparent shield elements mounted in the several frames, with their contiguous edges normally abutting.

In testimony whereof I affix my signature in presence of two witnesses.

BYRON L. SHUBERT.

Witnesses:
W. H. SUNDERLAND,
ERNEST SCHUBERT.